United States Patent [19]

Bienvenu

[11] 4,153,468
[45] * May 8, 1979

[54] ISOCYANATED POLYVALENT METAL SALTS OF NATURAL WAXES

[75] Inventor: Joseph O. Bienvenu, Longview, Tex.

[73] Assignee: Petrolite Corporation, St. Louis, Mo.

[ * ] Notice: The portion of the term of this patent subsequent to Jan. 25, 1994, has been disclaimed.

[21] Appl. No.: 746,889

[22] Filed: Dec. 2, 1976

Related U.S. Application Data

[63] Continuation-in-part of Ser. No. 534,682, Dec. 20, 1974, Pat. No. 4,004,932.

[51] Int. Cl.$^2$ .............................................. C09D 11/12
[52] U.S. Cl. ..................................... 106/31; 106/270; 106/271; 260/404.5
[58] Field of Search ..................... 106/10, 30, 31, 270, 106/271; 260/404.5, 414

[56] References Cited

U.S. PATENT DOCUMENTS

| | | | |
|---|---|---|---|
| 3,163,548 | 12/1964 | Stark | 106/31 |
| 4,004,932 | 1/1977 | Bienvenu | 106/31 |

FOREIGN PATENT DOCUMENTS 1185210  3/1970  United Kingdom.

Primary Examiner—Lorenzo B. Hayes
Assistant Examiner—W. Thompson
Attorney, Agent, or Firm—Sidney B. Ring; Hyman F. Glass

[57] ABSTRACT

This invention relates to isocyanated polyvalent metal salts of natural waxes; and to uses thereof, particularly in carbon paper inks.

12 Claims, No Drawings

ISOCYANATED POLYVALENT METAL SALTS OF NATURAL WAXES

This application is a continuation-in-part of Ser. No. 534,682 filed Dec. 20, 1974, now U.S. Pat. No. 4,004,932.

Ser. No. 534,682 discloses and claims isocyanated polyvalent metal salts of oxidized waxes which are useful in carbon paper inks.

Ser. No. 534,682 pertains to the isocyanation of oxidized waxes where the oxidized wax is first reacted with a polyvalent metal such as those of Periodic Table Groups II, IIIA and IV. Preferably, the polyvalent metal is an oxide or hydroxide of a divalent metal from Group IIA of the Periodic Table, or with an oxide or hydroxide of a monovalent metal from Group IA, followed by a base exchange with a di- or multivalent metal such as those of Groups II, IIIA, and IV prior to the isocyanation. Waxes produced according to Ser. No. 534,682 exhibit superior carbon paper ink properties to that of isocyanated waxes (i.e., without prior treatment with polyvalent metals), or waxes produced in accordance with procedures cited in my co-pending application, Ser. No. 534,678 filed Dec. 20, 1974, now U.S. Pat. No. 3,994,737 (i.e., treatment with polyvalent metal without isocyanation).

I have found that natural waxes such as plant waxes for example carnauba, ouricury, candelilla, sugar cane, Douglas fir, etc., waxes and earth and peat waxes such as Utah wax, Montan wax, etc., when treated with polyvalent metals such as those of Periodic Table Groups II, IIIA and IV and employed in carbon paper inks yield inferior carbon paper inks.

However, I have discovered that the isocyanation of such natural waxes pretreated with polyvalent metals yield improved carbon paper inks.

This is surprising in view of the fact that when natural waxes are isocyanated without pretreatment with polyvalent metals, such products are inferior to isocyanated natural waxes pretreated with polyvalent metals.

It is to be noted that whereas Ser. No. 534,682 relates to isocyanated polyvalent metal salts of oxidized hydrocarbon waxes, the present invention relates to *unoxidized* natural waxes.

The polyisocyanates, and more specifically the diisocyanates (containing two distinct and separate —N═C═O groups) are the preferred isocyanates for this invention. Representative isocyanates of this type are the polymethylene diisocyanates, the alkylene diisocyanates, the alkylidine diisocyanates, the heptylidene diisocyanates, the cycloalkylene diisocyanates, the aromatic diisocyanates, and the aliphatic-aromatic diisocyanates. Representative compounds of these groups are: (1) ethylene diisocyanate, trimethylene diisocyanate, tetramethylene diisocyanate, pentamethylene diisocyanate; (2) propylene-1,2-diisocyanate, butylene-1,2-diisocyanate, butylene-1,3-diisocyanate, butylene-2,3-diisocyanate; (3) ethylidene diisocyanate, butylidene diisocyanate, heptylidene diisocyanate; (4) cyclopentylene-1,3-diisocyanate, cyclohexylene-1,2-diisocyanate, cyclohexylene-1,4-diisocyanate; (5) m-phenylene diisocyanate, p-phenylene diisocyanate, 1-methylphenylene-2,4-diisocyanate, 1-methylphenylene-2,6-diisocyanate, 3-3 bitolylene-4,4-diisocyanate, naphthylene-1,4-diisocyanate, naphthylene-1,5-diisocyanate; (6) xylylene-1,4-diisocyanate, xylylene-1,3-diisocyanate, 4,4-diphenylenemethane diisocyanate, and 4,4-diphenylene propane diisocyanate.

Substituted derivatives of the above isocyanates, polyisothiocyanates, and compounds containing more than two —N═C═O groups such as 1,2,4-benzene triisocyanate may be used, however, the preferred isocyanates are the diisocyanates listed in the above paragraph.

Prepolymers prepared with diisocyanates and terminating in isocyanate groups can undergo usual isocyanate reactions and may be used in the process. Prepolymers containing terminal isocyanate groups may be prepared from diisocyanates and diols such as ethylene, propylene and butylene glycols; polymers of the glycols such as polyethylene, polypropylene, polybutylene, polyoxyethylene, polyoxypropylene, and polyoxybutylene glycols; hydroxyl terminated polyesters, di and polyamines, alkanolamines, and other polyhydric compounds.

The acid number of the natural waxes may vary from acid number of about 5 to 50 and a saponification number of about 50 to 150, but preferably an acid number of about 5 to 20 and a saponification number of about 50–100. Products with greater acid or saponification numbers may also be used. Concentration of the metal may vary from approximately the acid number equivalent to approximately the saponification number equivalent of the natural wax.

Any suitable polyvalent metal can be reacted with the natural wax, for example those of the following groups of the Periodic Table: II, IIIA, and IV. For example, natural wax is reacted with the oxide or hydroxide of a divalent metal of Group IIA of the Periodic Table, or with an oxide or hydroxide of a metal from Group IA followed by a double decomposition reaction with a di- or multivalent metal salt such as those of Groups II, IIIA, and IV. The resulting product is then reacted with an organic diisocyanate.

The nature of the product is dependent on the particular natural wax, and the amount of the reactants employed. Depending on the type of product desired, the amount of the metal and isocyanate employed may vary. The amount of the metal may vary from approximately the acid number equivalent to approximately the saponification number equivalent of the natural wax. However, with high acid number waxes the amount may have to be decreased to compensate for the increase in viscosity. Percent isocyanate reacted, based on weight of natural wax, may vary from about 1 to 10 or more but preferably from about 1 to 5 percent. Preferably, the acid number of the natural wax may vary from approximately 5 acid number to 20 acid number. Higher acid number products may also be used.

The following examples are presented by way of illustration and not of limitation.

EXAMPLE 1

Carnauba (T4-Filtered) wax is charged to a reactor and heated to 205°–210° F. Water (0.25% wt. basis) and 0.9% of calcium hydroxide are added and reacted at 205°–210° F. for 15–30 minutes. The water is then removed by distilling under vacuum at 240° F. to yield product 1A.

Temperature is adjusted to 235° F. and 5% of toluene - 2,4-diisocyanate is added to 1A and reacted for 6 hours at 240° F. to yield product 1B.

In Ex. 1, the wax prior to reaction has an acid number of 8.2 and a saponification number of 80.2. After reaction with the diisocyanate, the product 1B had an acid number of 3.5 and a saponification number of 75.8.

EXAMPLE 2A

Example 1 was repeated with Montan wax, employing 1% Ca(OH)$_2$ and 1% Toluene diisocyanate (TDI).

EXAMPLE 2B

Example 1A was repeated with Montan wax, employing 2.1% Ca(OH)$_2$ (without isocyanation).

In the above examples, the isocyanate reaction may be modified by reacting the isocyanate for one hour at 240° F., then adding approximately 0.25% of an amine such as triethylene diamine and reacting for an additional 30 minutes at 240° F. Also, the thermal stability of the finished product may be improved by incorporating 0.5 to 2.0% of a polyetherpolyol prior to or during the isocyanation. Alkanolamines or other multi-fractional hydroxyl compounds such as trimethylolpropane may be used. As indicated in the process, other bases and metal salts may be used. For example, zinc or aluminum salt when substituted for the calcium salt produced a product with excellent carbon ink properties. These products may be more desirable than the product derived with the calcium salt in certain applications.

As indicated by the data, the resulting products of the above examples prepared from natural waxes yield carbon ink waxes. These waxes yielded low viscosity (little thixotropy) carbon inks with good pigment dispersion. The inks displayed good flow, and oil retention properties. Although products prepared with natural waxes are generally inferior to the products of Ser. No. 534,682, such isocyanated products of natural waxes are desirable carbon ink waxes. For example unreacted carnauba wax gelled during the performance test on aging as described in Procedure I. Other natural waxes, such as Douglas fir bark wax, showed good improvement after treating according to the procedures of this invention.

Isocyanated divalent salts of natural waxes produced according to the procedures of this invention are superior to comparable isocyanated products derived from natural waxes *not* reacted as divalent salts.

Carbon ink properties of a wax are determined by testing the wax in a medium intensity black ink formulation as described in the following procedure. Some waxes were also tested in a more critical blue ink formulation which is also described.

Procedure I (Black Ink Formula)

| Materials: | Parts by Weight |
| --- | --- |
| Wax of this invention | 12.0 |
| Paraffin, 142° F. M.P. | 30.0 |
| Methyl Violet Base | 0.1 |
| Furnace Black | 22.0 |
| Toning Iron Blue | 3.0 |
| Mineral Oil, 100 SUS | 32.9 |

A mixture consisting of the wax, paraffin, and methyl violet is heated in an oven at 220°-230° F. for 2 hours, then charged to a steel ballmill and milled at 220°-230° F. for 5 minutes. A mixture comprising the carbon black, iron blue, and mineral oil which was previously heated to 220°-230° F. is added to the wax in the mill, and then milled at 220°-230° F. for 30 minutes. The ink is sampled in a glass jar (13.5 cm × 5.5 cm diameter) for viscosity determinations, and another sample is obtained in an aluminum weighing dish (2 cm × 6 cm diameter) for an oil-retention penetration.

Viscosity values of the ink are determined at 6, 12, 30, and 60 RPM at 215° F. with a Brookfield viscometer and No. 1 spindle. The ink sample is aged in an oven at 220° F. for 17 hours, and viscosity measurements are again determined at 6, 12, 30, and 60 RPM at 215° F.

The sample of ink in the aluminum weighing dish is aged at 77° F. for 17 hours, and the hardness of the ink is determined according to ASTM method D-1321.

The ink is formulated and tested as described in the above procedure. The following data was obtained.

Performance of Natural Waxes in Procedure 1

| Example | Reactants | Ink viscosity (Initial/aged)[1] | | | | Oil Retention Penetration |
| --- | --- | --- | --- | --- | --- | --- |
| | | 6 RPM | 12 RPM | 30 RPM | 60 RPM | |
| 1 | Carnauba, 0.9% Ca(OH)$_2$, 5% TDI | 38/470 | 40/307 | 34/174 | 30/100+ | 18 |
| 2 | Carnauba, 5%[2] TDI | 220/705 | 150/480 | 97/200+ | 68/200+ | 18 |
| 3 | Carnauba, 4%[2] TDI | 950/Gelled | 500+/Gelled | 200+/Gelled | 100+/Gelled | 18 |
| 4 | Carnauba, 0.9% Ca(OH)$_2$ | Visc./Gelled | Visc./Gelled | Visc./Gelled | Visc./Gelled | 20 |
| 5 | Carnauba[3] | GELLED | | | | |
| 6 | Montan 1% Ca(OH)$_2$ 1% Toluene Diisocyanate | 25/158 | 24/148 | 25/122 | 24/100+ | |
| 7 | Montan 2.1% Ca(OH)$_2$ | 60/viscous | 61/viscous | 58/viscous | 58/viscous | |
| | | (on aging product was too viscous for Brookfield measurement) | | | | |

[1]Brookfield, cps at 210-215° F.
[2]Isocyanated according to procedure described in 1B of the application.
[3]Product gelled during formulation (Procedure I).

OTHER USES

The products of the invention have been characterized as carbon paper ink waxes, however, they are also suitable for use in other inks such as news ink, flexographic ink, rotogravure ink, and screen ink. These products may be used in solvent inks, protective coatings, mold release compounds, and various types of polishes such as floor polish, shoe polish, furniture polish, and car polish. Products of the invention may be further modified by incorporating a monovalent metal, preferably potassium or lithium, for use in ink and polish formulations.

I claim:

1. An isocyanated polyvalent metal treated natural wax composition, said metal treatment being the conversion of acid components of said natural wax to the corresponding polyvalent metal salts and said isocyanated composition being the product obtained by reacting said salts with an organic polyisocyanate.

2. The composition of claim 1 where the polyvalent metal is a member of one of the following groups of the Periodic Table: II, IIIA, and IV.

3. The composition of claim 2 where the polyvalent metal is calcium, zinc or aluminum and the polyisocyanate is a diisocyanate.

4. The composition of claim 3 where the wax is carnauba, ouricury, candelilla, sugar cane, Douglas fir, Utah or Montan wax.

5. The composition of claim 4 where the wax is carnauba.

6. A carbon paper ink containing the composition of claim 1.

7. A carbon paper ink containing the composition of claim 2.

8. A carbon paper ink containing the composition of claim 3.

9. A carbon paper ink containing the composition of claim 4.

10. A carbon paper ink containing the composition of claim 5.

11. The composition of claim 1 wherein said natural wax is selected from the group consisting of plant waxes, earth waxes and peat waxes.

12. A carbon paper ink containing the composition of claim 11.

* * * * *